Patented Mar. 11, 1947

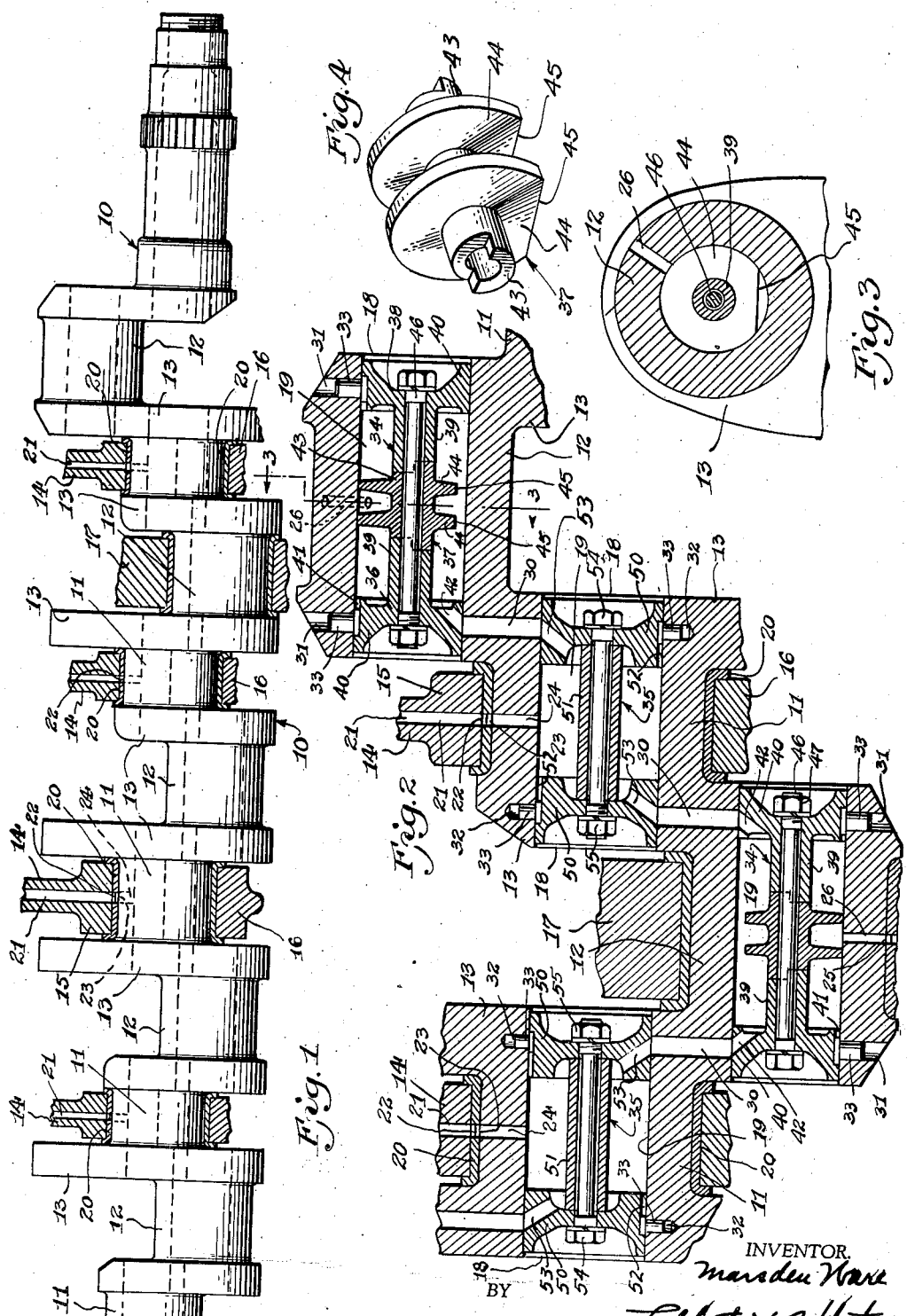

2,417,334

UNITED STATES PATENT OFFICE 2,417,334

INTERNAL-COMBUSTION ENGINE

Marsden Ware, Huntington Woods, Mich., assignor to Packard Motor Car Company, Detroit, Mich., a corporation of Michigan Application August 3, 1940, Serial No. 350,309

6 Claims. (Cl. 184—6)

This invention relates to engine crankshafts and more particularly to lubricating systems associated with crankshafts.

An object of the invention is to provide a crankshaft with filtering means for oil fed therethrough to the connecting rod bearings.

Another object of the invention is to provide a crankshaft in which plugs can be readily located and secured to closed hollow bearing portions to provide an internal oil feeding system.

A further object of the invention resides in the treatment of crankshaft cheeks whereby oil passages and plug anchor means can be formed by a single operation.

Still another object of the invention is to provide a sectional plug for a hollow crankshaft bearing that can be readily assembled and secured in position.

Other objects of the invention will appear from the following description taken in connection with the drawings, which form a part of this specification, and in which:

Fig. 1 is a fragmentary elevational view of a crankshaft having the invention incorporated therewith;

Fig. 2 is a longitudinal sectional view of a section of the crankshaft;

Fig. 3 is a transverse sectional view of the crankshaft through one of the connecting rod bearing portions taken on line 3—3 of Fig. 2;

Fig. 4 is a perspective view of the middle section of one of the plugs for a hollow bearing portion.

In the drawing, 10 indicates generally a multithrow crankshaft for an internal combustion engine having a plurality of main bearing portions 11 and rod bearing portions 12 joined by cheek portions 13. The crankshaft main bearing portions are carried by engine casing webs 14 having bearing portions 15 to which bearing caps 16 are applied in a conventional manner. Piston rods 17 are mounted on the rod bearing portions of the crankshaft in a conventional manner. The cheek portions of the crankshaft traverse and extend beyond the ends of the adjacent bearing portions and are provided with openings 18 that are formed as continuations of cylindrical axial openings 19 through the bearing portions.

Plain bushings 20 are arranged between the bearing portions of the crankshaft and the rod and casing bearings, the rod bushings being fixed in the rod hubs and the main bearing bushings being fixed to the supporting bearings. The webs 14 of the casing are drilled to form passages 21 leading from a pressure oil system (not shown) in a conventional manner to openings 22 through the associated bushings. Such bushings have an interior groove 23 extending around one half thereof into which opening 22 leads and the main crankshaft bearing portions are radially drilled to form oil feeding passages 24. Thus passages 24 register with grooves 23 during one half of each revolution of the crankshaft and oil will flow therethrough to the hollow interior of the bearing portions.

The rod bushings 20 are formed with semi-circular interior grooves 25 with which radial passages 26 through the rod bearing portions register during each half revolution of the crankshaft. Thus oil from the interior of the rod bearing portions will be fed between the rod bearing portions and their bushings. Oil so fed will move axially of the bearing structures and will fall into the engine casing where it is again picked up by the pressure lubricating system.

In order to feed the oil from the hollow main bearing portions to the rod bearing portions of the crankcase, the cheek portions are drilled from one end forming a passage 30 between the openings 18 therein. The cheeks will also thus be provided with open end passages 31 and in some instances the cheek end remote from the drilled end can be drilled to form a blind opening 32. Passages 30 form oil feeding channels while passages 31 and 32 provide seats for pilot members 33.

Plug structures are provided in the hollow crankshaft bearing portions and adjacent cheek openings to seal the oil therein, to provide a connection between the passages 30 in the cheek portions and the interiors of the adjacent hollow crankshaft bearing portions, and to separate foreign particles from the oil and prevent their passage through the crankshaft bearing portion passages. These plug structures 34 for the rod bearing portions of the crankshaft are slightly different from the plug structures 35 in the main bearing portions but in each case they consist of a plurality of axially aligned sections that can be readily located and secured.

The plug structures 34 consist of three sections 36, 37 and 38, the end sections 36 and 38 having stem portions 39 with peripherally flanged disk portions 40 at one end. These disk portions close the openings in the cheek openings on each end of the hollow interior of the rod bearing portions and are formed with peripheral slots 41 to receive the pilot members 33. These disk portions are also formed with angularly extending passages 42 through their flanges that register with openings 30 in the cheek portions of the crankshaft and open into the interior of the rod bearing portions of the crankcase at a point inwardly of their periphery. The intermediate section 37 of these plug structures has a stem portion 43 and the ends are formed irregular and complementary to the inner ends of the stems of sections 36 and 38 so that they will interlock to prevent rotation of the sections relatively. A pair of spaced disk flanges 44 extend from the central section stem portion and are of the same diameter as the hollow interior of the rod bearing portions of the crankshaft except for cut away or flattened peripheral portions 45. When assembled the disk flanges 44 confine the passages 26 therebetween with the flattened peripheries on the opposite side of the rod bearing portion interior and this relation is secured through means of the location of the pilot members 33 and the location of slots 41. Bolts 46 extend axially through the sections 36, 37 and 38, and the sections 36 and 38 are drawn up and clamped against the pilot members 31 by nuts 47. Thus the plug structures are readily fixed axially from rotation and confine the oil passages 26 between flanges 44.

The plug sections 35 have flanged disk end sections 50 and an intermediate spacer stem section 51. These disk sections are formed similar to the disk portions of sections 36 and 38. They have a peripheral slot 52 in which the pilot members can project, a diagonal passage 53 through the flange registering with the adjacent cheek portion passage 30 and opening into the interior of the main bearing portions of the crankshaft within the peripheries. The stem section abuts the disk sections and bolts 54 extend therethrough and the sections are drawn together axially by nuts 55. The pilot members serve as abutments that prevent rotation of the disk sections, to limit the clamping action of the securing means and as a part of the oil feeding conduit.

Oil is moved into the interior of the main bearing portions of the crankshaft under pressure through web passages 21, the bushings and passages 23. From such spaces the oil is moved by pressure and centrifugal force through the plug passages 53 to the adjacent cheek portion passages 30 and through the disk passages 42 to the interior of the rod bearing portions of the crankshaft. The oil passes over the flattened portions 45 of flanges 44 into the space therebetween and then through passages 26 to the groove 25 in the rod bushing. Any foreign particles in the oil in the hollow crankshaft bearing portions will be thrown outwardly by centrifugal force so that the flanges 44 will substantially prevent such particles from moving to the outlet passages 26, confining them in the bearing portion interior. As the diagonal feeding passages in the disk portions of both types of plug sections terminate within the periphery of the hollow bearing portions of the crankshaft, foreign particles, heavier than oil, thrown outwardly by centrifugal force will be held outside of the ends of such passages so that they will not flow therethrough. Thus foreign particles in the oil fed into the crankshaft will, for the most part, be trapped so that they will not flow on to the bearing surfaces.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A crankshaft comprising main and rod bearing portions having radially extending oil passages and axial openings therethrough, cheek portions connecting said bearing portions, said cheeks having openings forming continuations of the bearing portion openings and a drilled passage extending through one end into the opposite end with the central portion of each passage connecting the openings, internal pilot members seated in the inner end portions of the passages and projecting into the cheek portion openings, and sectional plug structures secured in the openings in the cheeks and bearing portions, the end sections of said plug structures being insertable separately endwise into the openings in adjacent cheeks and having peripheral slots extending axially to one end for receiving said pilot members.

2. A crankshaft comprising main and rod bearing portions having axial openings and radial oil passages therethrough, cheek portions connecting said bearing portions having openings therethrough forming continuations of the openings in said bearing portions, said cheek portions having passages therethrough connecting the openings in the cheek portions, pilot means seated in the cheek portions and projecting into the openings therein, interlocking sectional plugs in the openings in the bearing portions and cheek portions having axially extending peripheral slots in the end portions thereof for receiving the pilot means when moved endwise into the openings, and means clamping the end sections of the plugs axially against the pilot means.

3. A crankshaft comprising main and rod bearing portions having radial oil passages and axial openings therethrough, cheek portions connecting adjacent bearing portions having openings therethrough forming continuations of the bearing portion openings, said cheek portions having passages connecting the interiors of adjacent bearing portions, plug means having slotted end sections closing the ends of the interior of the hollow bearing portions and overlying the cheek portion passages, said plug means having passages therein for connecting the openings in the cheek portion passages, pilot means fixed in openings in the cheek portions and projecting into the openings therein in a relation to enter the slotted portions of said plug means to register the plug means passages with the cheek portion passages and prevent rotation of the plug means, and means clamping the plug means sections axially against said pilot means.

4. A plug structure for a hollow crankshaft bearing portion comprising three aligned sections, the end sections each having a stem with a radially extending disk flange at one end and the middle section having a stem with radially extending spaced disk flanges intermediate its ends, said spaced disk flanges having corresponding flattened portions, the adjacent ends of said stems interlocking to prevent relative rotation of said sections, and means securing the sections together axially.

5. A crankshaft comprising main and rod bearing portions having axial openings and radial passages therethrough, cheek portions connecting said bearing portions having axial openings therethrough aligned with the bearing portion openings and radial passages therethrough connecting the openings therein, pilot means in the radial passages in the cheek portions and projecting into the axial openings therein, a plug in the openings in the bearing and cheek portions having three axially aligned sections adapted to interlock in a predetermined relationship at their adjacent ends, the end sections having openings therethrough connecting the passages in the cheek portions with the openings in the bearing portions and peripheral slots for receiving the pilot means, the intermediate plug sections having a pair of radially extending disk members for shielding the zone around the radial openings in the bearing portions when assembled in the crankshaft and flattened peripheries diametric to the radial openings in the bearing portions to allow oil flow axially through the openings in the bearing portions, and means clamping the plug sections together axially with the pilot means lying in the peripheral slots in the end sections of the plug.

6. A plug structure for a hollow crankshaft bearing portion comprising three aligned sections having interlocking stem portions, disk flanges extending radially from the remote ends of said end sections and a pair of disks extending radially from the middle section, said pair of disks being cut away on a peripheral portion thereof and all of the disks being otherwise similar in radius to the interior of the bearing portion, and means clamping the stem portions of the sections together in an axial direction.

MARSDEN WARE.

REFERENCES CITED

The following references are of record in the file of this patent:

UNITED STATES PATENTS

| Number | Name | Date |
|---|---|---|
| 1,331,907 | Fessenden | Feb. 24, 1920 |
| 1,331,638 | Green et al. | Feb. 24, 1920 |
| 1,555,279 | Duesenberg | Sept. 29, 1925 |
| 1,674,191 | Chilton | June 19, 1928 |

FOREIGN PATENTS

| Number | Country | Date |
|---|---|---|
| 418,517 | British | Oct. 26, 1934 |
| 219,890 | British | Aug. 7, 1924 |
| 598,610 | French | Oct. 2, 1925 |